March 5, 1957 R. HASTINGS, JR 2,784,280
CONTROL HANDLE FOR CIRCUIT SELECTOR
Filed Jan. 30, 1953 2 Sheets-Sheet 1
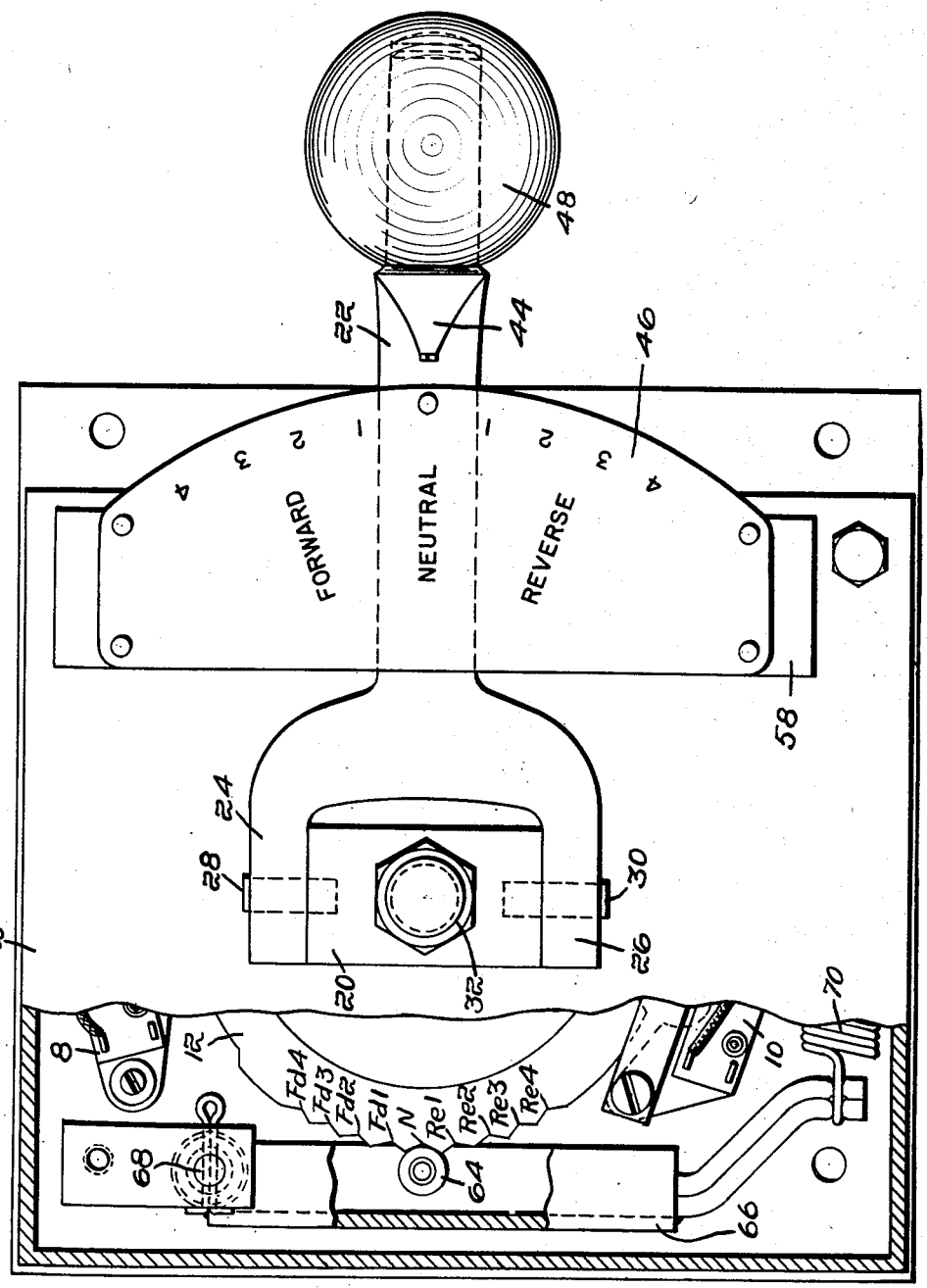

March 5, 1957 R. HASTINGS, JR 2,784,280
CONTROL HANDLE FOR CIRCUIT SELECTOR
Filed Jan. 30, 1953 2 Sheets-Sheet 2
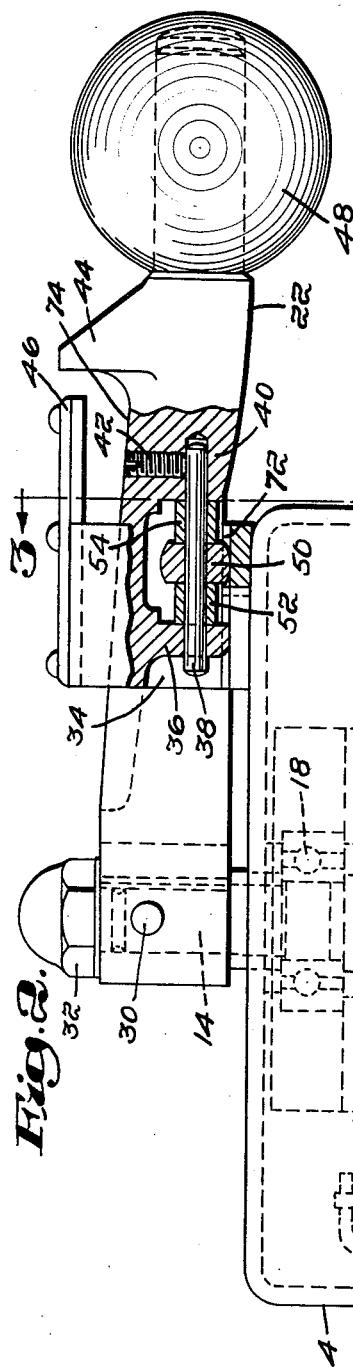
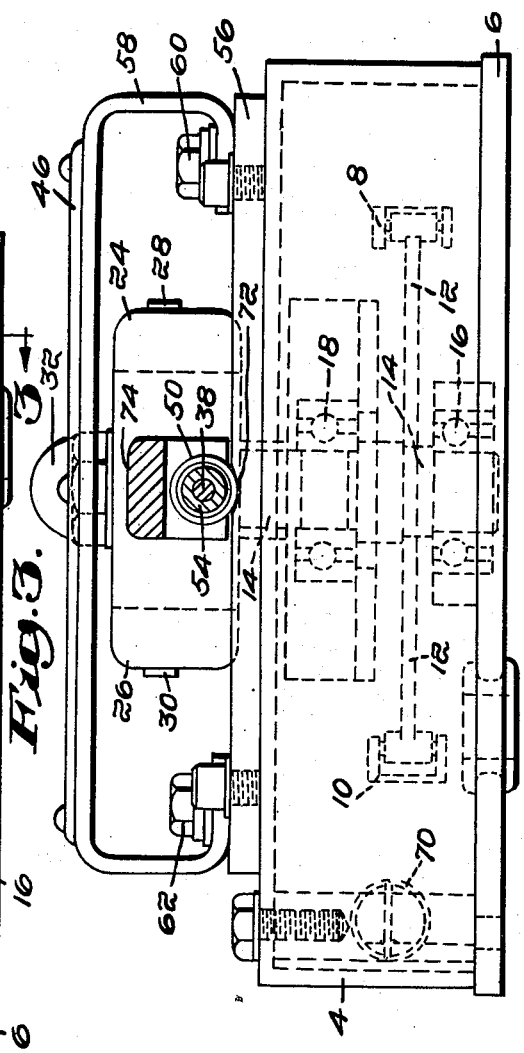
Inventor:
Russell Hastings Jr
by C. Yardley Chittick
Attorney

United States Patent Office 2,784,280
Patented Mar. 5, 1957

2,784,280

CONTROL HANDLE FOR CIRCUIT SELECTOR

Russell Hastings, Jr., Wellesley Hills, Mass., assignor to Lewis-Shepard Company, Watertown, Mass., a corporation of Massachusetts Application January 30, 1953, Serial No. 334,126

2 Claims. (Cl. 200—153)

This invention relates to an improved type of control handle for use with a circuit selecting mechanism. The invention has found particular use in electric trucks of that type commonly used in industry for facilitating material handling. Such trucks are used in factories, in warehouses, on docks and railroad platforms for moving material and handling freight and the like. In the operation of these trucks, the operator is provided with a steering wheel or steering lever for directing the truck, a control lever for causing the circuits to be set to move the truck forward or backward at the proper speed, and a brake for bringing the truck to a halt. The invention herein disclosed and claimed is particularly concerned with the construction and actuation of the aforementioned control lever.

The truck operator customarily uses his left hand on the steering wheel for guiding the truck and his right hand on the control lever for determining the direction and velocity of movement. In trucks of the aforementioned type, it is customary to have a plurality of speeds forward and reverse, usually four forward and four reverse. The forward speeds are brought into action by moving the control handle forward and the reverse speeds by moving the control handle to the rear. A neutral position is located between the forward and reverse speeds.

If the truck has been moving forward with the control handle in a forward speed position and the operator then desires to place the controls in neutral, he will move the control handle through the lower forward speeds to neutral position. However, since there is no mechanical element to stop the handle positively at neutral position, it is very easy for the operator to be deceived into thinking the handle is in neutral when in reality it is in either first speed forward or first speed reverse, these two positions being very close to neutral.

Accordingly, it is an object of this invention to provide a control handle construction which may be used with conventional controls of the type now commonly found in electric trucks of this type which will enable the operator to determine solely from a sense of feel when the control handle is in neutral position. The invention further contemplates a construction which, while indicating neutral position, will offer no greater resistance than heretofore to moving the control handle from neutral to first speed forward or to first speed reverse. That is to say, while the operator can tell with certainty when the control lever is in neutral (in which position it will be held in the same manner in which the control lever is held in all of the forward and reverse positions) still, the added certainty of the position does not result in a greater effort to move it out of neutral. The control handle can be moved just as smoothly and easily as heretofore, thus enabling the operator to start the truck properly.

The nature of the invention will be more clearly understood as the description proceeds with the aid of the accompanying drawings in which—

Fig. 1 is a plan view of a switch box actuated by the control handle. The box is broken away in part to show the mechanism used to maintain the control handle and cam at the various selected positions.

Fig. 2 is a front elevation of Fig. 1.

Fig. 3 is a side elevation taken on the line 3—3 of Fig. 2.

Referring to the several figures, 2 is a switchbox having a cover 4 and a base 6 on which are mounted a plurality of switches indicated at 8 and 10 which switches are circumferentially disposed about a flat plate cam 12. The outer circumference of the cam is suitably cut so that when rotated, it will actuate the switches in proper sequence to set up the required circuits for the selected speed of the truck.

Cam 12 is fixedly mounted on a cam shaft 14 which in turn is mounted for rotation in lower and upper sets of bearings 16 and 18 supported on the base 6. The upper end of cam shaft 14 has keyed thereto a block 20 to which is affixed the control handle 22. The left end of the control handle as viewed in Fig. 1 is forked as at 24 and 26. These forked ends are pivotally attached to block 20 by the pivots 28 and 30. Nut 32 holds block 20 in its normal position on shaft 14.

The construction of control handle 22 is as follows: It is undercut at 34 with a depending web 36 acting as one support for a short shaft 38 the other end of which is supported in the body of the handle at 40. Shaft 38 is maintained in position by a set screw 42. The outer end of the handle has an upwardly extending element 44 which acts as a pointer in relation to an indicator plate 46. The handle has on its outer end a hand gripping ball 48 which the operator preferably grips in shifting the handle's position.

Shaft 38 carries a roller 50 which is maintained in proper position by two bushings 52 and 54. Roller 50 rides on a plate 56 affixed to the top of cover 4 as the control handle may be moved forward or back, pivoting about the cam shaft 14. A bridge structure formed by the U-shaped member 58, the ends of which are bolted to the cover as at 60 and 62, carries on its top the indicator plate 46, which as shown in Fig. 1, has suitable markings thereon so that the operator will know the position to which to move the control handle to put the truck at the proper speed.

The left hand portion of cam 12 as viewed in Fig. 1 has a plurality of notches in its periphery which have been indicated as N, Fd1, Fd2, Fd3, Fd4, Re1, Re2, Re3 and Re4. A roller 64 carried by a U-shaped frame 66 which is pivoted at 68 and drawn by spring 70 in a counter-clockwise direction to press roller 64 against one of the aforementioned notches, acts to hold the cam 12 in whatever position it has been placed by movement of control handle 22. Thus, with the control handle 22 in the position shown in Fig. 1, with the pointer 44 opposite neutral position, roller 64 will be pressed into notch N to hold the control handle in neutral in which location the circuits will be open and the truck motor will not be operating. If the control handle is moved to the forward speeds as indicated by the number 1, 2, 3 and 4 on the indicator plate 46, the notches Fd1, Fd2, Fd3 and Fd4 will successively be engaged by roller 64. In this way the cam 12 will be held by roller 64 in whatever position it had been placed by movement of control handle 22. Similarly, if the control handle is moved to any one of the reverse positions 1, 2, 3 and 4 shown on indicator plate 46, the roller 64 will successively engage notches Re1, Re2, Re3 and Re4 to hold the cam 12 in the selected reverse position. It will be understood, of course, that whenever cam 12 is placed in any forward or reverse position, it will actuate suitable switches such as 8 and 10 to set up the required circuits for the selected speed.

It will be noted that the notches N, Fd1, Fd2, Fd3, Fd4, Re1, Re2, Re3 and Re4 are identical in configuration. They are relatively shallow notches which, cooperating with roller 64, are adequate to hold the cam 12 in the selected position. At the same time, however, very little turning force is required of the operator to move the control handle 22 from one notch to the next. This is an intentional arrangement to facilitate smooth and easy movement of the control handle by the operator. If the notches are too deep or the spring 70 too strong or both, the necessary use of greater force by the operator to move the cam from its present position might cause the cam to be inadvertently moved two or three positions instead of one which would result in a speed unexpectedly greater or less than the operator intended, with consequent lack of control when maneuvering in close quarters. It is obviously desirable that the notch N be the same configuration as the other notches so that no greater force is required to move handle 22 from neutral than from any other position.

However, since all of the heretofore referred to notches are identical, there is nothing in the relationship of notch N to roller 64 that would indicate to the operator through his sense of feel when he had moved control handle 22 to neutral position. He could, of course, tell that the handle was in neutral by looking at the indicator plate 46 to see the position of pointer 44. It would facilitate truck operation, however, if the operator could, with certainty, move the control lever to neutral without the necessity of looking at the indicator plate.

Therefore, to enable the operator to know through the sense of touch only when cam plate 12 is in neutral position, there has been placed in plate 56 a notch 72 located in the path of travel of roller 50 and into which roller 50 will drop when the notch N is in full engagement with roller 64. The downward movement of roller 50 into notch 72 is accomplished solely by the force of gravity plus any downward pressure applied to handle 22 by the operator's hand. Handle 22, as explained previously, is pivoted on pivots 28 and 30 extending from block 20. Upward movement of lever 22 is limited by the engagement of the handle's upper surface 74 with the underside of the bridge 58, but when the handle 22 has been lifted to this extent or less, the roller 50 will be entirely clear of notch 72 and slightly over the surface of plate 56.

The effect of this construction is as follows: If handle 22 is in one of the forward positions and the operator desires to bring it to neutral, he merely swings the handle to the rear toward neutral with his hand bearing down on the handle in the normal manner. Roller 50 rolls along plate 56 and in due course drops into notch 72. The operator, of course, can feel this slight descent of the handle and he knows at that time that the notch N is in engagement with roller 64 and that the handle is in neutral position. Thus, solely by the sense of feel, the operator knows when neutral has been reached, and this is so whether the handle has been moved to neutral position from either a forward or reverse position. On the other hand, notch 72 need offer no resistance to the movement of cam 12 from position N to position Fd1 or Re1. The reason for this is that when the operator desires to move handle 22 from neutral, he merely lifts the handle 22 a trifle which will take roller 50 out of engagement with notch 72, but will in no way change the nature of the engagement of roller 64 with the notch N. The operator then shifts handle 22 to the required forward or reverse speed in the normal manner. As soon as roller 50 has been moved by handle 22 to one side of notch 72, the operator may then allow the handle 22 to descend until the roller 50 is again in engagement with plate 56, after which it continues in engagement with plate 56 until returned again to notch 72 in neutral position.

It is my intention to cover all changes and modifications of the example of the invention herein chosen for purposes of the disclosure which do not constitute departures from the spirit and scope of the invention.

I claim:

1. In combination, a housing containing a plurality of circuit setting switches, a cam for actuating said switches, a cam shaft mounted on bearings fixed with respect to said housing and supporting said cam for movement with respect to said switches, a control handle carried by said cam shaft and extending laterally above the top of said housing, a flexible connection between said handle and said cam shaft permitting some vertical movement of said handle with respect to said cam shaft, a plate mounted on the top of said housing, a roller carried by said handle and in rolling engagement with said plate as said handle is swung through its cam operating arc, means cooperating with said cam for maintaining said cam in any one of a succession of selected switching positions and a neutral position therebetween to which said cam may move by actuation of said handle, and a notch in said plate of sufficient depth so that when said roller drops into the said notch the operator will feel such motion and said cam will be in said neutral position with respect to the setting of said switches.

2. In combination, a housing containing a plurality of circuit setting switches, means including a cam for selectively actuating said switches, handle means for moving said cam to a neutral position and to other positions each of which corresponds to a position of actuation of one of said switches, resilient means for arresting the travel of said cam at said neutral and other positions, said handle also being mounted for free motion between an upper and a lower plate on said housing in a plane normal to the direction of travel of said handle when said handle is being employed to move said cam, and means on said lower plate operatively associated with said handle for arresting the travel of said handle at said neutral position only when said handle is moved downwardly to abut said lower plate.

References Cited in the file of this patent

UNITED STATES PATENTS

| 1,048,119 | Wood | Dec. 24, 1912 |
| 2,182,715 | Yeske | Dec. 5, 1939 |

FOREIGN PATENTS

| 641,135 | Great Britain | Aug. 2, 1950 |